(12) United States Patent
Iluz et al.

(10) Patent No.: US 9,368,875 B2
(45) Date of Patent: Jun. 14, 2016

(54) ANTENNA SYSTEM AND USES THEREOF

(75) Inventors: Zeev Iluz, Gan-Yavne (IL); Amir Boag, Yavne (IL); Yael Hanein, Caesarea (IL); Jacob Scheuer, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 203 days.

(21) Appl. No.: 14/115,401

(22) PCT Filed: May 3, 2012

(86) PCT No.: PCT/IL2012/050157
§ 371 (c)(1),
(2), (4) Date: Nov. 4, 2013

(87) PCT Pub. No.: WO2012/150599
PCT Pub. Date: Nov. 8, 2012

(65) Prior Publication Data
US 2014/0138546 A1      May 22, 2014

Related U.S. Application Data

(60) Provisional application No. 61/481,758, filed on May 3, 2011.

(51) Int. Cl.
| | | |
|---|---|---|
| *H01Q 13/08* | (2006.01) | |
| *B82Y 20/00* | (2011.01) | |
| *G02F 1/29* | (2006.01) | |
| *H01Q 1/38* | (2006.01) | |
| *H01Q 21/29* | (2006.01) | |
| *G01J 1/02* | (2006.01) | |

(Continued)

(52) U.S. Cl.
CPC .............. *H01Q 13/085* (2013.01); *B82Y 20/00* (2013.01); *G01J 1/02* (2013.01); *G01J 1/0407* (2013.01); *G21K 5/00* (2013.01); *H01Q 1/38* (2013.01); *H01Q 21/29* (2013.01); *G02F 1/292* (2013.01); *G02F 2203/11* (2013.01)

(58) Field of Classification Search
CPC ..................................................... H01Q 13/085
USPC .......................................................... 250/349
See application file for complete search history.

(56) References Cited

U.S. PATENT DOCUMENTS

| | | | |
|---|---|---|---|
| 6,839,036 B1 | 1/2005 | Apostolos et al. | |
| 2002/0149529 A1* | 10/2002 | Fleming et al. | ............... 343/767 |

(Continued)

FOREIGN PATENT DOCUMENTS

| | | |
|---|---|---|
| WO | WO 2008/033257 | 3/2008 |
| WO | WO 2012/150599 | 11/2012 |

OTHER PUBLICATIONS

International Search Report and the Written Opinion Dated Oct. 15, 2012 From the International Searching Authority Re.: Application No. PCT/IL2012/050157.

(Continued)

*Primary Examiner* — David Porta
*Assistant Examiner* — Mindy Vu

(57) ABSTRACT

An antenna system comprises a first end-fire antenna element and a second end-fire antenna element facing each other in a planar arrangement, the antenna elements being configured such as to cause destructive interference between individual end-fire radiations of the elements, while maintaining constructive interference generally perpendicular to the planar arrangement.

26 Claims, 14 Drawing Sheets

(51) Int. Cl.
*G01J 1/04* (2006.01)
*G21K 5/00* (2006.01)

(56) References Cited

U.S. PATENT DOCUMENTS

2007/0262405 A1  11/2007  Furuyama
2009/0262036 A1  10/2009  Thevenard et al.
2010/0145190 A1  6/2010   Bourqui et al.

OTHER PUBLICATIONS

Alu et al. "Wireless at the Nanoscale: Optical Interconnects Using Matched Nanoantennas", Physical Review Letters, XP055039924, 104(21): 213902-1-213902-4, May 1, 2010.

Alù et al. "Hertzian Plasmonic Nanodimer as an Efficient Optical Nanoantenna", Physical Review B, 78(19): 195111-1-195111-7, Nov. 2008.

Alù et al. "Input Impedance, Nanocircuit Loading, and Radiation Tuning of Optical Nanoantennas", Physical Review Letters, XP055039919, 101: 043901-1-043901-4, 2008.

Bouhelier et al. "Near-Field Second-Harmonic Generation Induced by Local Field Enhancement", Physical Review Letters, XP002518700, 90: 013903-1-013903-4, 2003.

Crozier et al. "Optical Antennas: Resonators for Local Field Enhancement," Journal of Applied Physics, XP012060310 ,94(7): 4632-4642, Oct. 1, 2003.

Cubukcu et al. "Plasmonic Laser Antennas and Related Devices", IEEE Journal of Selected Topics in Quantum Electronics, 14(6): 1448-1461, Nov./Dec. 2008.

Derkacs et al. "Improved Performance of Amorphous Silicon Solar Cells via Scattering From Surface Plasmon Polaritons in Nearby Metallic Nanoparticles", XP012088770, Applied Physics Letters, 89: 093103-1-093103-3, 2006.

Gibson "The Vivaldi Aerial", 9th European Issue Microwave Conference, Brighton, UK, Sep. 17-20, 1979, XP031601955, p. 101-105, 1979.

Hanson "On the Applicability of the Surface Impedance Integral Equation for Optical and Near Infrared Copper Dipole Antennas", IEEE Transactions on Antennas and Propagation, 54(12): 3677-3685, Dec. 2006.

Iluz et al. "Dual-Vivaldi Wideband Nanoantenna With High Radiation Efficiency Over the Infrared Frequency Band", Optics Letters, XP001569537, 36(15): 2773-2775, Aug. 1, 2011.

Kappeler et al. "Field Computations of Optical Antennas", Journal of Computational and Theoretical Nanoscience, 4(3): 686-691, 2007.

Kuhn "Enhancement of Single-Molecule Fluorescence Using a Gold Nanoparticle as an Optical Nanoantenna", Physical Review Letters, XP007902034, 97(1): 017402-1-017402-4, Jul. 7, 2006.

Li et al. "Shaping Light Beams in the Nanometer Scale: A Yagi-Uda Nanoantenna in the Optical Domain", Physical Review, XP055039927, 76(24): 24503-1-24503-7, Dec. 1, 2007.

Mühlschlegel et al. "Resonant Optical Antennas", Science, 308(10): 1607-1609, Jun. 10, 2005.

Novotny "Effective Wavelength Scaling for Optical Antennas", Physical Review Letters, 98: 266802-1-266802-4, Jun. 29, 2007.

Novotny et al. "Antennas for Light", Nature Photonics, XP055015468, 5(2): 83-90, Feb. 1, 2011.

Pakizeh et al. "Unidirectional Ultracompact Optical", Nano Letters, XP055039923, 9(6): 2343-2349, Jun. 10, 2009.

Povinelli "A Planar Broad-Band Flared Microstrip Slot Antenna", IEEE Transactions on Antennas and Propagation, AP-35(8): 968-972, Aug. 1987.

\* cited by examiner

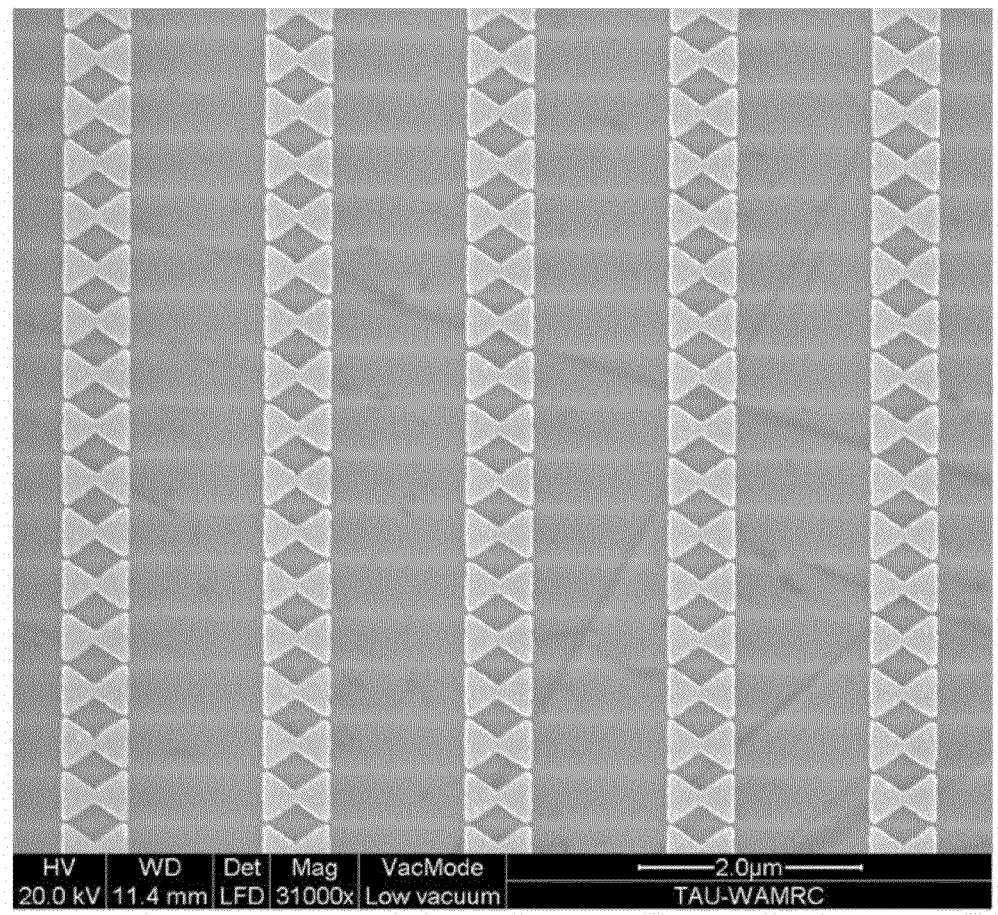

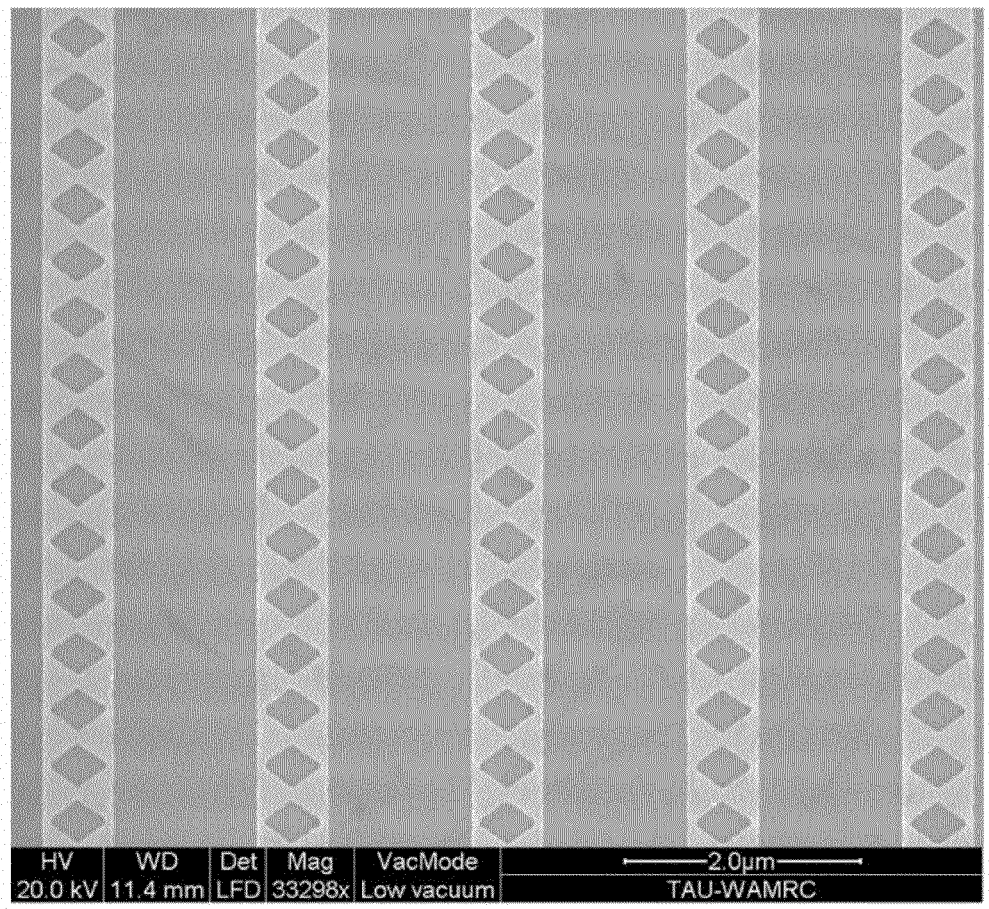

ANTENNA SYSTEM AND USES THEREOF

RELATED APPLICATIONS

This application is a National Phase of PCT Patent Application No. PCT/IL2012/050157 having International filing date of May 3, 2012, which claims the benefit of priority under 35 USC §119(e) of U.S. Provisional Patent Application No. 61/481,758 filed on May 3, 2011. The contents of the above applications are incorporated herein by reference in their entirety.

FIELD AND BACKGROUND OF THE INVENTION

The present invention, in some embodiments thereof, relates to an antenna system fabrication and, more particularly, but not exclusively, to an antenna system having two end-fire antenna elements facing each other.

Optical radiation is typically manipulated by redirecting its wave front with lenses and mirrors, which are subject to diffraction. As a consequence of this diffraction, optical fields cannot be localized to dimensions which are much less than the optical wavelength.

Nano-antennas provide a solution as they can efficiently couple the energy of free-space radiation to a confined region of sub-wavelength size. Although the use of radiofrequency (RF) antennas is widespread, such as in the radio- and microwave regimes, they are an emerging technology at optical frequencies.

Heretofore, there have seen a considerable amount of work devoted to nano-antennas for the IR and optical frequencies [Crozier et al., J. Appl. Phys., 94, 4632 (2003); Derkacs et al., Appl. Phys. Lett., 89, 093103 (2006); Kuhn et al., Phys. Rev. Lett., 96, 017402 (2006); and Bouhelier et al.]. In terms of performances, conventional nano-antennas having a broad frequency band of operation are characterized by low radiation efficiency [Alù et al., Phys. Rev. Lett., 101, 043901 (2008)].

SUMMARY OF THE INVENTION

According to an aspect of some embodiments of the present invention there is provided an antenna system. The system comprises a first end-fire antenna element and a second end-fire antenna element facing each other in a planar arrangement, the antenna elements being configured such as to cause destructive interference between individual end-fire radiations of the elements, while maintaining constructive interference generally perpendicular to the planar arrangement.

According to some embodiments of the invention the system wherein the first end-fire antenna element is identical to the second end-fire antenna.

According to some embodiments of the invention each of the antenna elements is a slot antenna element having a tapered profile.

According to some embodiments of the invention the tapered profile is characterized by an opening rate selected such that a ratio between an imaginary part and a real part of an impudence of the antenna system is less than 50%.

According to some embodiments of the invention the opening rate is from about 0.0001 to about 0.01 $nm^{-1}$.

According to some embodiments of the invention each slot has a stub and an aperture and is symmetric with respect to a meridian line connecting the stub and aperture, perpendicularly to the aperture.

According to some embodiments of the invention each slot has a stub and an aperture and is asymmetric with respect to a meridian line connecting the stub and aperture, perpendicularly to the aperture.

According to some embodiments of the invention each of the antenna elements is a Vivaldi antenna element.

According to some embodiments of the invention the first and the second antenna elements are made of a metal characterized by a skin depth for a predetermined optical frequency and wherein a thickness of the antenna elements is at least 2 times the skin depth.

According to some embodiments of the invention the first and the second antenna elements are separated by at least one air gap.

According to some embodiments of the invention a width of the gap is selected so as to allow emission of radiation in a transverse optical mode while suppressing higher optical modes.

According to some embodiments of the invention a width of the gap is at least 10 nm.

According to some embodiments of the invention the system comprises a waveguide coupled to the gap.

According to some embodiments of the invention the waveguide is a parallel plate waveguide.

According to some embodiments of the invention at least one of the first and the second end-fire antenna elements has a nanometric size along at least one dimension of the element. According to some embodiments of the invention at least one of the first and the second end-fire antenna elements has a nanometric size along a largest dimension of the element.

According to an aspect of some embodiments of the present invention there is provided an antenna array. The array comprises a plurality of antenna systems as delineated above and optionally as further exemplified hereinbelow.

According to some embodiments of the invention at least a portion of the antenna systems are connected in series with respect to a characteristic direction of the end-fire radiations.

According to some embodiments of the invention at least a portion of the antenna systems are connected in parallel with respect to a characteristic direction of the end-fire radiations.

According to some embodiments of the invention the antenna systems are connected via DC connection.

According to an aspect of some embodiments of the present invention there is provided a method of detecting electromagnetic radiation. The method comprises generating condition for the radiation to interact with the antenna system or array as delineated above and optionally as further exemplified hereinbelow, and collecting electrical signals generated by the antenna system.

According to an aspect of some embodiments of the present invention there is provided a method of emitting electromagnetic radiation, comprising applying voltage to the antenna system or array as delineated above and optionally as further exemplified hereinbelow.

According to an aspect of some embodiments of the present invention there is provided a method of converting electromagnetic radiation into electricity, comprising generating condition for the radiation to interact with the antenna system or array as delineated above and optionally as further exemplified hereinbelow, and collecting electrical signals generated by the antenna system.

According to some embodiments of the invention the electromagnetic radiation comprises radiation in the infrared range.

According to some embodiments of the invention the electromagnetic radiation comprises radiation in the visible range.

According to an aspect of some embodiments of the present invention there is provided an optical sensor system, comprising the antenna system or array as delineated above and optionally as further exemplified hereinbelow.

According to an aspect of some embodiments of the present invention there is provided an optical communication system, comprising the antenna system or array as delineated above and optionally as further exemplified hereinbelow.

According to an aspect of some embodiments of the present invention there is provided an imaging system, comprising the antenna system or array as delineated above and optionally as further exemplified hereinbelow.

According to an aspect of some embodiments of the present invention there is provided a light projector, comprising the antenna system or array as delineated above and optionally as further exemplified hereinbelow.

According to an aspect of some embodiments of the present invention there is provided a high harmonics generating system, comprising the antenna system or array as delineated above and optionally as further exemplified hereinbelow.

According to an aspect of some embodiments of the present invention there is provided a wave mixing system, comprising the antenna system or array as delineated above and optionally as further exemplified hereinbelow.

According to an aspect of some embodiments of the present invention there is provided a frequency conversion system, comprising the antenna system or array as delineated above and optionally as further exemplified hereinbelow. According to some embodiments of the invention the frequency conversion system is configured for up conversion. According to some embodiments of the invention the frequency conversion system configured for down conversion.

According to an aspect of some embodiments of the present invention there is provided a phased array, comprising the antenna system or array as delineated above and optionally as further exemplified hereinbelow.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
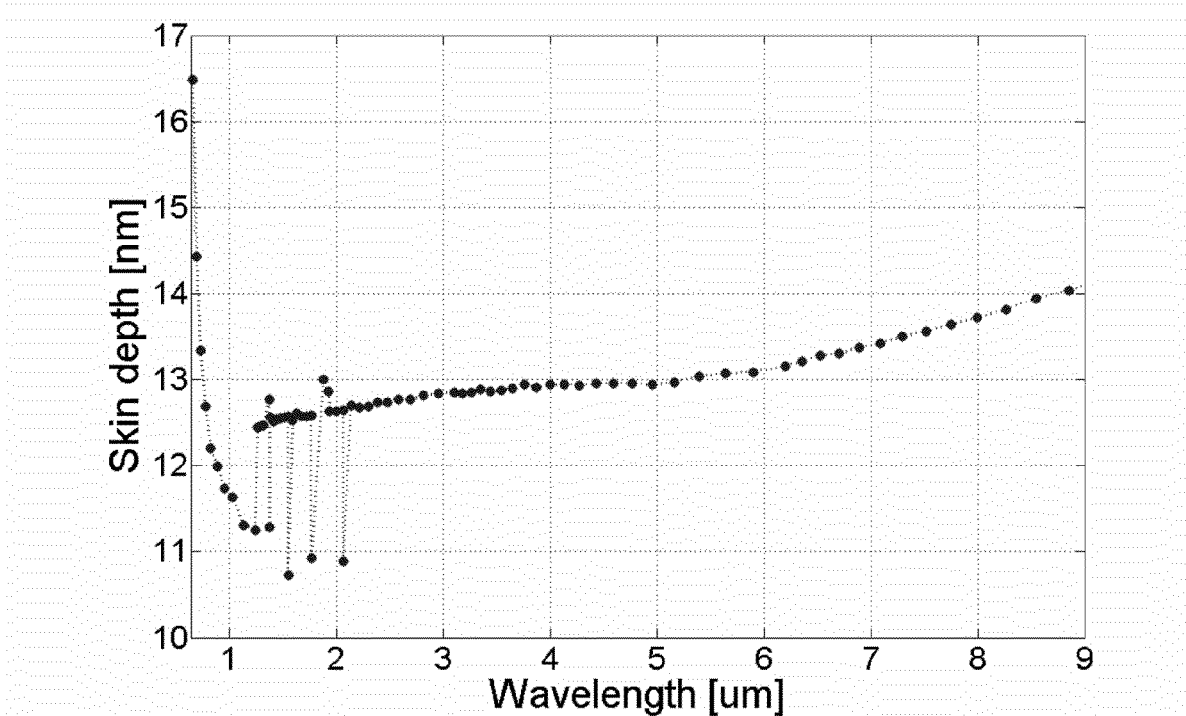
FIG. 1 shows skin depths of gold as a function of the wavelength in $\mu m$.

The present invention, in some embodiments thereof, relates to an antenna system fabrication and, more particularly, but not exclusively, to an antenna system having two end-fire antenna elements facing each other.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventors have devised efficient wideband antenna system. The antenna system of the present embodiments is useful in many applications, including, without limitation, precision tracking, radar, communications, energy harvesting, near-field optical microscopy, harmonic generation and sensing. In particular, the antenna system of the present embodiments is useful in applications utilizing ultra wideband (UWB) radiation.

As used herein "UWB radiation" refers to radiation having a spectrum occupying a bandwidth of at least 15%, more preferably at least 20%, more preferably at least 25% of its center frequency.

An antenna is oftentimes characterized by an impedance bandwidth which relates to the range Δf of frequencies for which the impedance of the antenna remains generally constant (e.g., impedance variations of less than 20% or less than 10% or less than 5%). The impedance bandwidth is typically expressed in percentage according to the formula $100 \times \Delta f/f_c$, where $f_c$ is the center frequency of the spectrum. In some embodiments of the present invention UWB radiation has an impedance bandwidth of at least 100% or at least 110% or at least 120%, e.g., 129%.

In some embodiments of the present invention UWB radiation has a spectrum occupying a bandwidth of at least 2000 nm or at least 2100 nm or at least 2200 nm or at least 2300 nm or at least 2400 nm or at least 2500 nm, with return losses above −9.5 dB.

The background art fails to teach antenna configurations which are both efficient and broad-band, particularly at IR frequencies. At RF, typically, metallic antenna thickness is significantly larger than the skin depth. Thus, overly thin conductors with high resistance leading to low radiation efficiency are avoided. However, in the IR range the skin depth does not decrease monotonically as the frequency increases.

The skin depth is defined as $\delta_S = 1/\alpha$ where $\alpha$ is the real part of the complex propagation constant (also known as the absorption coefficient). For example, in gold, the skin depth remains at roughly 13 nm over a large part of the IR band and even increases at the beginning of the visible spectrum as shown in FIG. 1. Thus, for the IR frequency a 40-50 nm thick gold, which is several times the skin depth, nano-antenna elements are required in order to achieve sufficiently high radiation efficiency.

The antenna system according some embodiments of the present invention is a traveling wave antenna. Unlike in resonant antennas, the traveling wave antenna of the present embodiments features a gradual transition from wave guiding to radiation. It was found by the present inventors that such gradual transition leads to a wide bandwidth and improved efficiency. In some embodiments of the present invention the antenna system has a tapered geometry.

Figure 2A:
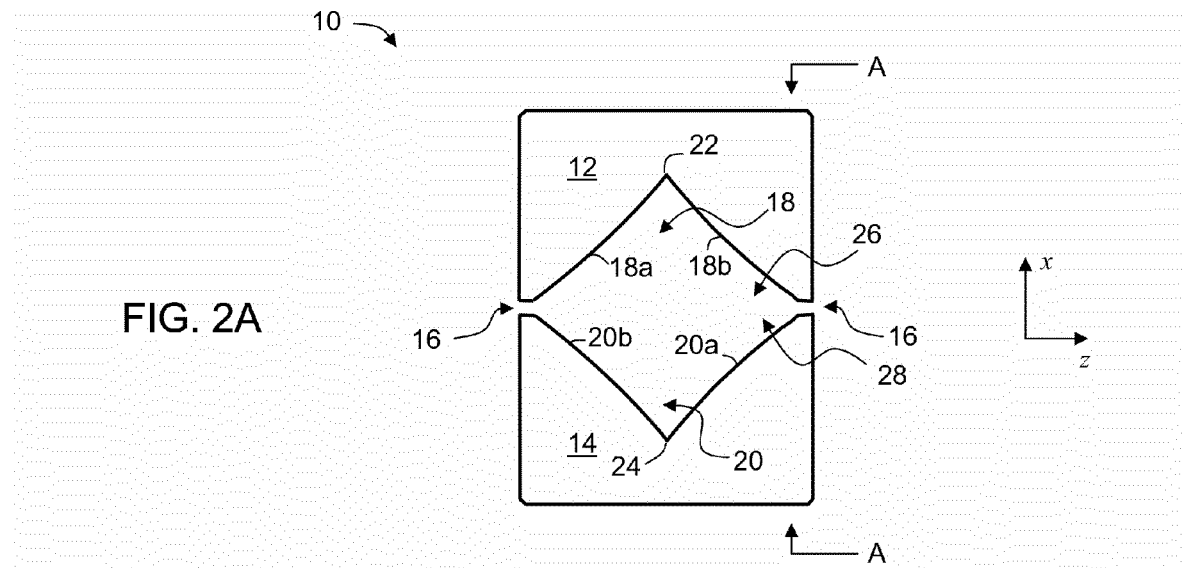
FIGS. 2A and 2B are schematic illustrations of a top view (FIG. 2A) and a side view (FIG. 2B) of an antenna system according to some embodiments of the present invention.
Figure 2B:
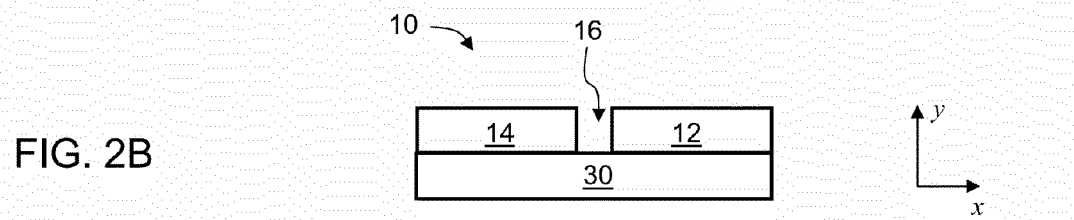

FIGS. 2A and 2B are schematic illustrations of a top view (FIG. 1A) and a side view (along line A—A of FIG. 1A) of an antenna system 10 according to some embodiments of the present invention. For clarity of presentation, a Cartesian coordinate system is also illustrated in FIGS. 2A and 2B. As shown, FIG. 2A is parallel to the x-z plane and FIG. 2B is parallel to the x-y plane. The direction parallel to the y axis is referred to as the thickness direction.

Antenna system 10 optionally and preferably provide UWB radiation.

System 10 comprises a first end-fire antenna element 12 and a second end-fire antenna element 14 facing each other in a planar configuration.

As used herein, an end-fire antenna element refers to generally planar antenna element which emits radiation into free space or an adjacent substance, from, or in proximity to an edge of the antenna element, wherein the maximum radiation intensity is in the plane engaged by the element or substantially parallel to that plane.

In some embodiments of the invention, more than 50% or more than 60% or more than 70% or more than 80% or more than 90% of the radiation energy is emitted from, or in proximity to the edge and is in the plane engaged by the element or substantially parallel to that plane Representative examples of end-fire antenna elements include, without limitation, tapered dielectric rod, Vivaldi antenna element, slot antenna element, dipole antenna element, and the like.

Both elements 12 and 14 are generally planar and engage the same plane. Elements 12 and 14 are preferably made of metal, such as, but not limited to, gold and aluminum, and they can be deposited on a dielectric substrate 30, which can be made, for example, of Quartz, Silicon or any other dielectric material. In some embodiments of the present invention element 12 and 14 have similar shapes and sizes. For example, elements 12 and 14 can be identical to each other.

In various exemplary embodiments of the invention at least one of elements 12 and 14, more preferably both elements 12 and 14 are nanometric in size. Specifically, the characteristic length of one or both elements 12 and 14 along at least one, more preferably at least two directions, is nanometric. In some embodiments of the present invention the largest dimension of element 12 and/or 14 is nanometric.

As used herein, nanometric length refers to a length less than micron.

The thickness of elements 12 and 14 is typically several times larger than the skin depth at the respective frequency. For IR radiation, the thickness is preferably from about 50 nm to about 500 nm or from about 60 nm to about 400 nm or from about 70 nm to about 300 nm or from about 80 nm to about less than 200 nm or from about 90 nm to about 150 nm.

Each of the planar dimensions of elements 12 and 14 (namely the lengths as measured along the x and z axes) is typically of on the order of a few hundred nanometers (e.g., about 200 nm or about 300 nm or about 400 nm or about 500 nm or about 600 nm or about 700 nm or about 8 or about 900 nm).

Elements 12 and 14 are positioned such as to form one or more air gaps therebetween. In the representative example illustrated in FIG. 2, two air gaps are shown at 16.

In various exemplary embodiments of the invention the width of the gap is less than half the wavelength at the highest operational frequency of system 10. This is advantageous since it allows the system to emit the transverse electromagnetic (TEM) mode while suppressing higher optical modes.

From performances standpoint, the gap between elements 12 and 14 is preferably sufficiently narrow so as not to reduce electric field enhancement when the antenna operates in the receive mode. From manufacturing standpoint, the width of the gap is selected above or at the minimal resolution of the fabrication technique. For example, E-beam lithography allows fabricating system 10 with an air gap of a few nanometers or more. A typical width of the air gap is from about 10 nm to about 40 nm or from about 20 nm to about 30 nm, e.g., about 25 nm.

Each of elements 12 and 14 has ends (narrow side faces) parallel to their thickness direction (the y axis in the present example) and broadside faces perpendicular to their thickness direction (parallel to the x and axes in the present example). During transmission, elements 12 and 14 preferably emit radiation from their narrow side faces. Radiation emitted from the narrow side face of an antenna element is referred to herein as "end-fire radiation." Radiation propagating along the thickness direction is referred to herein as "broadside radiation."

In various exemplary embodiments of the invention elements 12 and 14 are configured such as to cause destructive interference between their individual end-fire radiations, and constructive interference between their individual broadside radiations. Such configuration provides a bi-directional antenna pattern.

In various exemplary embodiments of the invention one or both elements 12 and 14 is a slot antenna element having a slot characterized by a tapered profile. Also contemplated are other time of end-fire elements, including, without limitation, log-periodic and Yagi antenna elements.

In the representative example illustrated in FIGS. 2A and 2B, system 10 comprises a pair of slot antenna elements. The slots are generally shown at 18 and 20. Each slot extends from a closed end, referred to as a stub, to an open end, referred to as an aperture, along a median line which is generally parallel to the x direction. The slots are tapered in the sense that the width of each slot widens from a minimum at the stub to a maximum at the aperture. The subs of slots 18 and 20 are respectively designated 22 and 24, and the apertures of slots 18 and 20 are respectively designated 26 and 28.

The slots 18 and 20 can have any tapered profile. Specifically, any of the edges 18a, 18b, 20a and 20b can be linear, curved or a combination of linear and curved shapes. In some embodiments of the present invention one or both of slots 18 and 20 has a an exponential flare shape. An antenna element having such a slot is known as a Vivaldi antenna element and described in P. J. Gibson, "The Vivaldi Aerial," in Proc. $9^{th}$ European Microwave Conference, UK, June 1979, 101-105.

For example, a slope edge (e.g., edge 18a) of a Vivaldi antenna element can have an upper part in the x-z plane described by:

$$x = C_1 \exp(Rz) + C_2$$

where R is a constant referred to as an opening rate, and the $C_1$ and $C_2$ are constants defined by $$C_1 = \frac{x_{end} - x_{start}}{\exp(Rz_{end}) + \exp(Rz_{start})}$$

$$C_2 = \frac{x_{start}\exp(Rz_{end}) - x_{end}\exp(Rz_{start})}{\exp(Rz_{end}) + \exp(Rz_{start})},$$

where $(x_{start}, z_{start})$ and $(x_{end}, z_{end})$ are the coordinates of edge 18a at the aperture 26 and stub 22, respectively. In various exemplary embodiments of the invention the other edges are constructed as mirror images of edge 18a with respect to axes x and/or z. One of ordinary skill in the art would be able to obtain the expression for the other edges based on the above formulae.

Unlike conventional Vivaldi antennas in which the pick gain is perpendicular to the thickness direction, system 10 produces its main radiation lobe parallel to the thickness direction, thus effectively serving as a broadside emitting system. This is advantageous since it allows integrating the antenna system in planar configurations, for example, using E-beam lithography process. In some embodiments of the present invention the antenna device poses fewer fabrication restrictions as compared to dipole and bow-tie antennas, in particular in terms of the gap size between the antenna terminals.

It was found by the inventors of the present invention that the dimensional parameters of the antenna system, particularly the opening rate R, the length of the apertures 26 and 28 (along the z axis), and the distance between the stubs 22 and 24 (along the x axis) can be selected to tune the radiation pattern such as to provide the peak gain at the antenna broadside.

Figure 3:
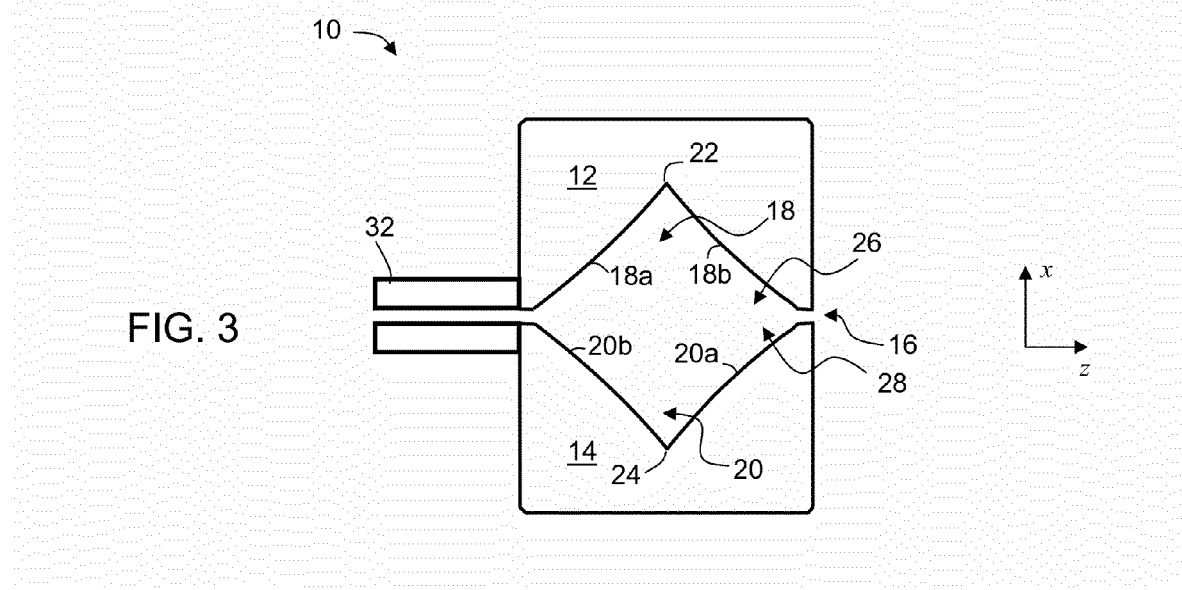
FIG. 3 is a schematic illustration of an antenna system in embodiments of the invention in which the antenna system comprises a waveguide.

The antenna of the present embodiments can be integrated with a waveguide 32, which can be connected to system 10 at gap 16 as shown in FIG. 3. Waveguide 32 can be a parallel plate waveguide. Use of parallel plate waveguides is advantageous since it allowed employing wider gaps compared to the gap required in conventional a dipole-like antennas.

The configuration of the present embodiments allows combining multiple antenna systems in parallel at their terminals, thus providing more degrees of freedom in order to match the combined system to its load or excitation. The width and height of waveguide 30 are preferably the same or similar to the width of gap 16 and the thickness of the antenna elements, respectively. Preferably, impedance matching is employed between the parallel plate waveguide and the antenna system.

For a parallel plate waveguide having width $W_1$ and height h, the impedance can be approximated as $Z_0 = \eta W_1/h$, where $\eta$ is the free space impedance. For example, for $W_1 = 25$ nm, h=120 nm and $\eta = 377\Omega$, the impedance of a parallel waveguide is about 78.5Ω. Thus, in this embodiment, the impedance of antenna system 10 is preferably also about 78.5Ω.

In various exemplary embodiments of the invention the ratio between the imaginary part of the impudence (the reactance) and the real part of the impudence (the resistance) of antenna system 10 is less than 50% or less than 40% or less than 30% or zero, for all of the operational bandwidth. This can be achieved by a judicious selection of the length of the apertures, the distance between the stubs and/or the opening rate R of the slots. Typically, but not exclusively, the opening rate is from about 0.0001 $\text{nm}^{-1}$ to about 0.01 $\text{nm}^{-1}$ or from about 0.0005 $\text{nm}^{-1}$ to about 0.005 $\text{nm}^{-1}$ or from about 0.001 $\text{nm}^{-1}$ to about 0.003 $\text{nm}^{-1}$, e.g., about 0.002 $\text{nm}^{-1}$.

Thus, the geometry of antenna system 10 is optionally and preferably selected based on the material properties of metals at the respective frequencies, e.g., IR frequencies. In some embodiments of the present invention the antenna has both high radiation efficiency and good impedance matching properties over a wide frequency band (more than 112%) in the IR frequency band.

According to some embodiments of the invention the antenna device is characterized by radiation efficiency of at least X for any frequency from F1 to F2, wherein X equals 60% or 70% or 80%, e.g., 85%, F1 equals about 140 THz or about 130 THz or about 120 THz, and F2 equals about 390 THz, or about 400 THz, or about 410 THz.

Figure 4:
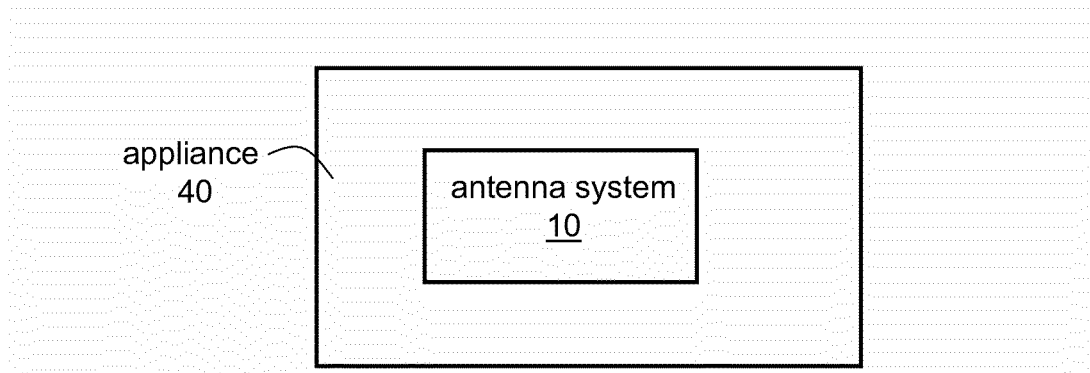
FIG. 4 is a schematic illustration of an appliance which includes an antenna system, according to some embodiments of the present invention.

FIG. 4 is a schematic illustration of an appliance 40 which includes antenna system 10, according to some embodiments of the present invention. Appliance 40 communicates with the environment, via optical radiation transmitted and/or received by antenna system 10. The load on antenna system 10 can be non-linear. This is particularly useful when appliance 40 is used for rectification or second harmonic generation. The optical radiation is optionally and preferably in the IR range. Many types of appliances are contemplated, including, without limitation, an optical sensor system, an optical communication system, an imaging system, a light projector, a high harmonics generating system, a wave mixing system, a frequency conversion system (configured for up conversion and/or down conversion), a phased array and the like.

It is expected that during the life of a patent maturing from this application many relevant appliances utilizing antennas will be developed and the scope of the term appliance is intended to include all such new technologies a priori.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Nano-antenna System with a Pair of Vivaldi Elements

Figure 5:
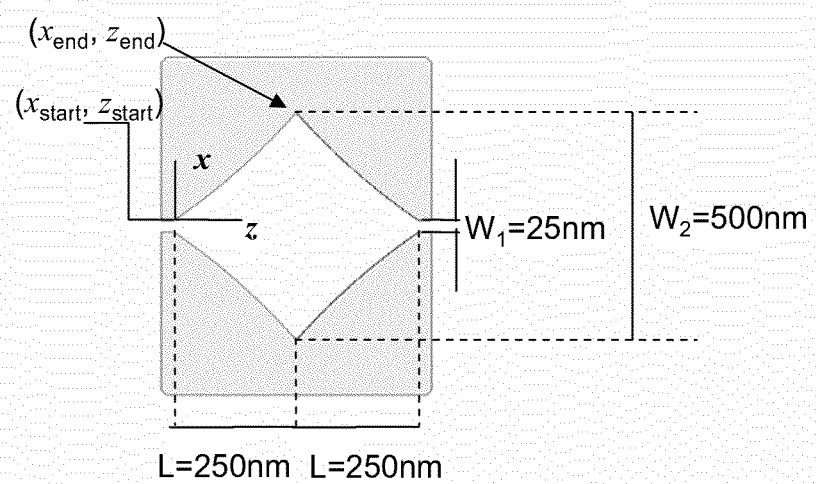
FIG. 5 is a schematic illustration of a nano-antenna system used in computer simulations performed according to some embodiments of the present invention.

A nano-antenna system was designed according to some embodiments of the present invention. The nano-antenna system included a pair of Vivaldi elements, as illustrated in FIG. 5. As shown the width $W_1$ of the air gap was 25 nm, the distances between the stubs of the slots was 500 nm and the length of the apertures was 2L=500 nm. The thickness of the elements was 120 nm. The size of the gap was selected to facilitate fabrication in a standard E-beam lithography based process, and the thickness was about ten times the skin depth of gold for IR radiation (see FIG. 1). The antenna was designed to operate at wavelength of from 700 nm to 3250 nm.

The resulting Dual Vivaldi antenna can be fabricated as a single metallic layer on planar substrate and has a bi-directional radiation pattern normal to the substrate surface. This is country to other designs, such as directive 3D Yagi-Uda antenna [Dregely et al., Nature Communications 2, 267, 2011], or nanoloop antenna [Ahmadi et al., Optics Letters, 35, 21, 2010] which involve considerably more complicated multi layered structures.

In computer simulations performed by the present inventors, each of the Vivaldi elements was fed by integrated parallel plate waveguide, with a gap of $W_1$=25 nm and thickness of h=120 nm. The parallel plate impedance $Z_0$ was 78.5Ω, as calculated using the relation $Z_0=\eta W_1/h$, with $\eta$=377. Impedance matching between the parallel plate waveguide and the nano-antenna for the above dimensions and wavelengths was achieved by selecting an opening rate R=0.002 $nm^{-1}$.

In the simulations, the antenna was simulated in the center of a Quartz substrate with lateral dimensions of 2×2 μm and thickness of 1 μm. These dimensions are sufficiently large to make the simulation results generally independent of the substrate size.

Figure 6A:
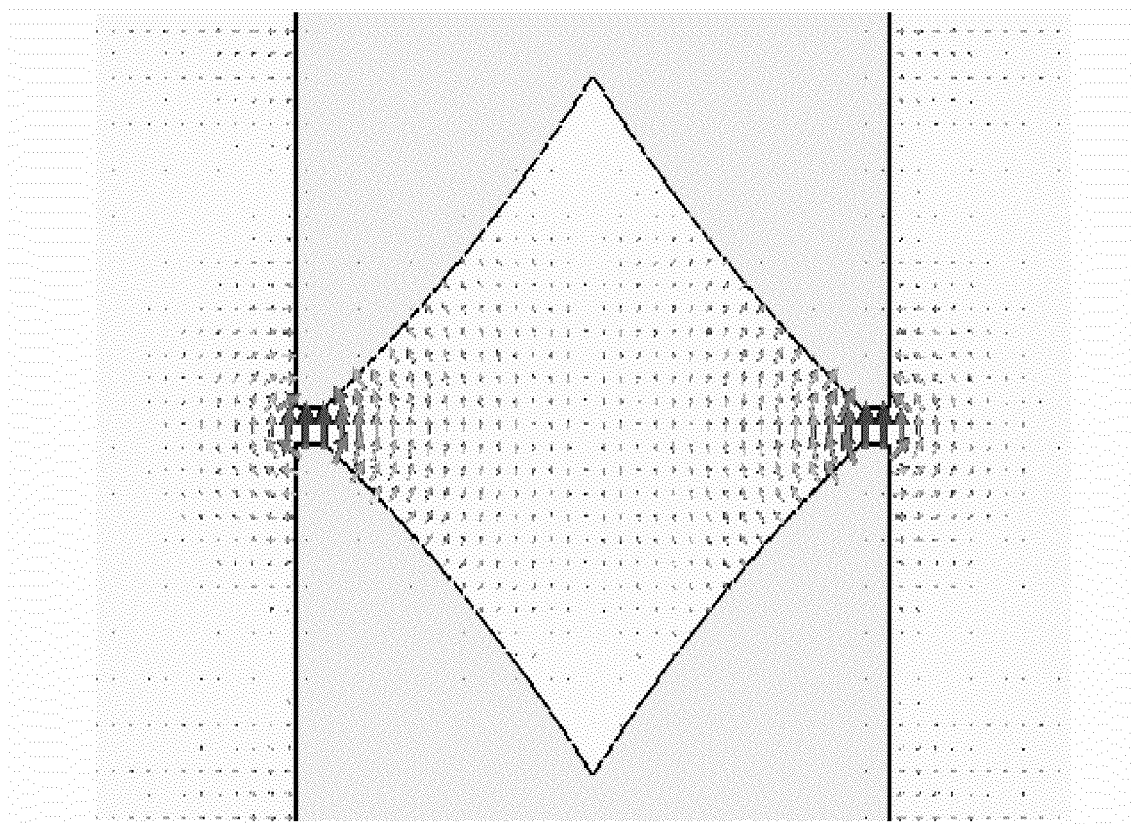
FIGS. 6A-C show electric field distributions as obtained by computer simulations performed according to some embodiments of the present invention.
Figure 6B:
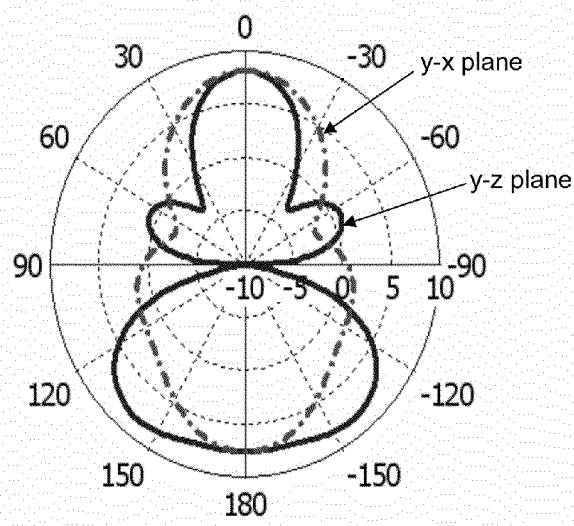
Figure 6C:
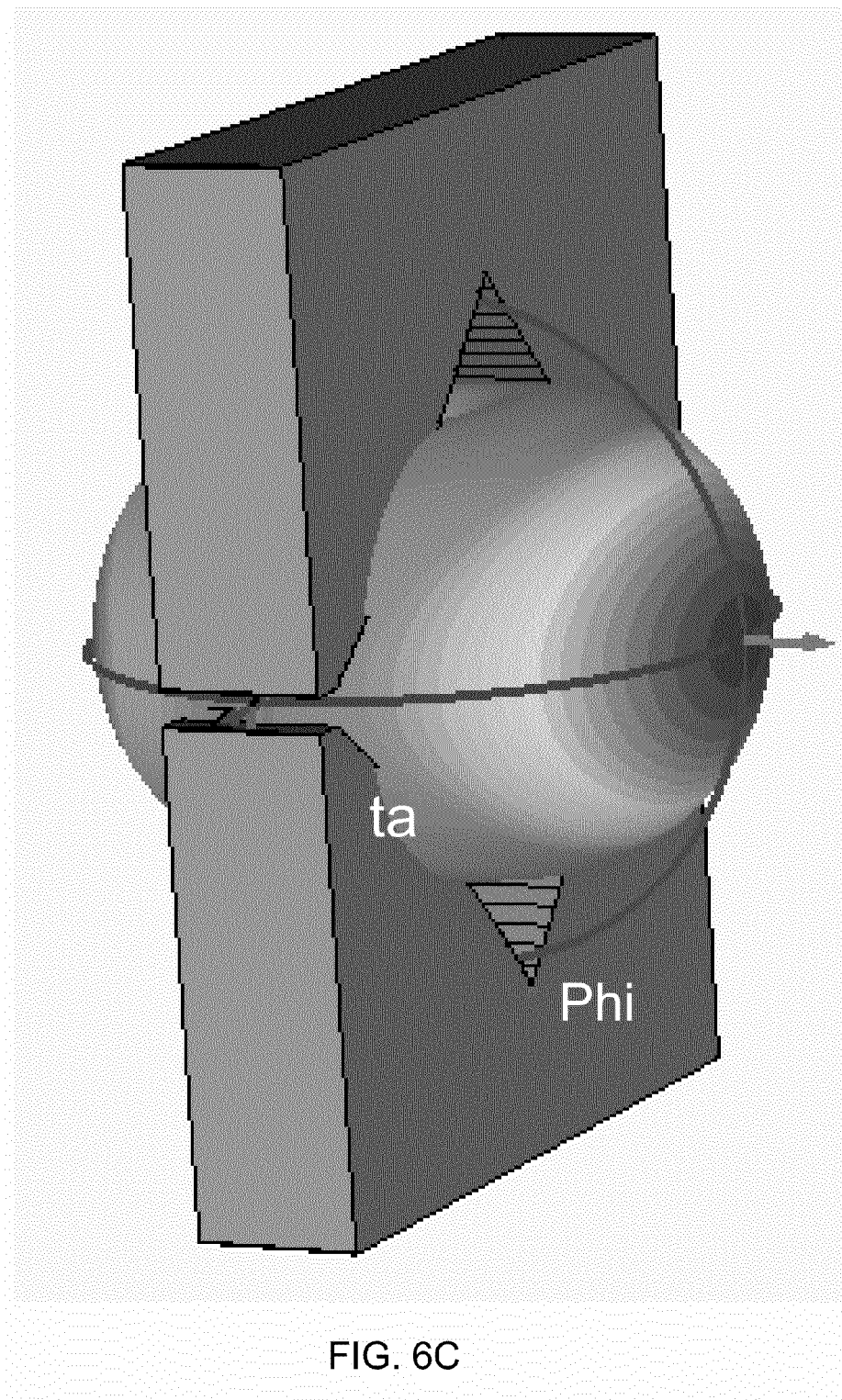

The simulation were performed by using commercial software CST MWS, with the finite elements frequency domain solver. The gold complex index of refraction (N, K) database at the IR frequencies [E. Palik, *Handbook of Optical Constants of Solids*, vol. 1. New York: Academic, 1985] was defined in the simulation so that the correct measured index of refraction value was used at each frequency point. Both parallel plate waveguide gaps were excited coherently and in phase, using ports across the gaps. The electric field distribution at 1.58 μm over the antenna half thickness plane (y=0) is shown in FIG. 6A and the resulting far field pattern is shown in FIG. 6B. A three-dimensional illustration of the electric field distribution is shown in FIG. 6C.

As shown in FIG. 6A, most of the electric field is concentrated in the air gap within the parallel plate waveguide starting at the antenna terminals. The smooth tapering of the antenna system generated gradually transition of the electric field from the guided mode to radiation as the gap increases. This leads to a highly efficient radiating antenna, because the dominant field remains normal to the conductor surface, thus reducing the conduction losses. FIG. 6B demonstrates non symmetric far field pattern due to the Quartz substrate effect.

Figure 7:
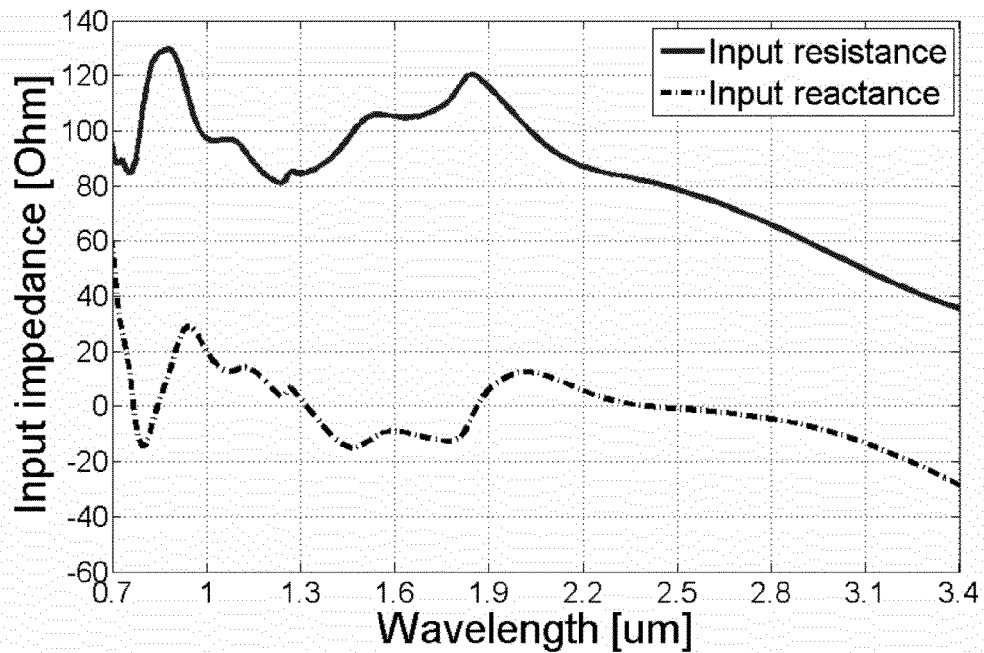
FIG. 7 shows input resistance and reactance obtained by computer simulations performed according to some embodiments of the present invention.

FIG. 7 shows the simulated input resistance and reactance. As shown, the return loss of the antenna system of the present embodiments is better than −9.5 dB for the range of 700 nm to 3250 nm (129% impedance bandwidth). Unlike a dipole antenna featuring a single resonance behavior, the antenna system of the present embodiments exhibits a multi resonance behavior characteristic for finite size traveling wave configurations. FIG. 7 demonstrates that the input resistance is relatively constant (at about 100Ω), and the input reactance oscillates around zero in the frequency band of operation.

Figure 8A:
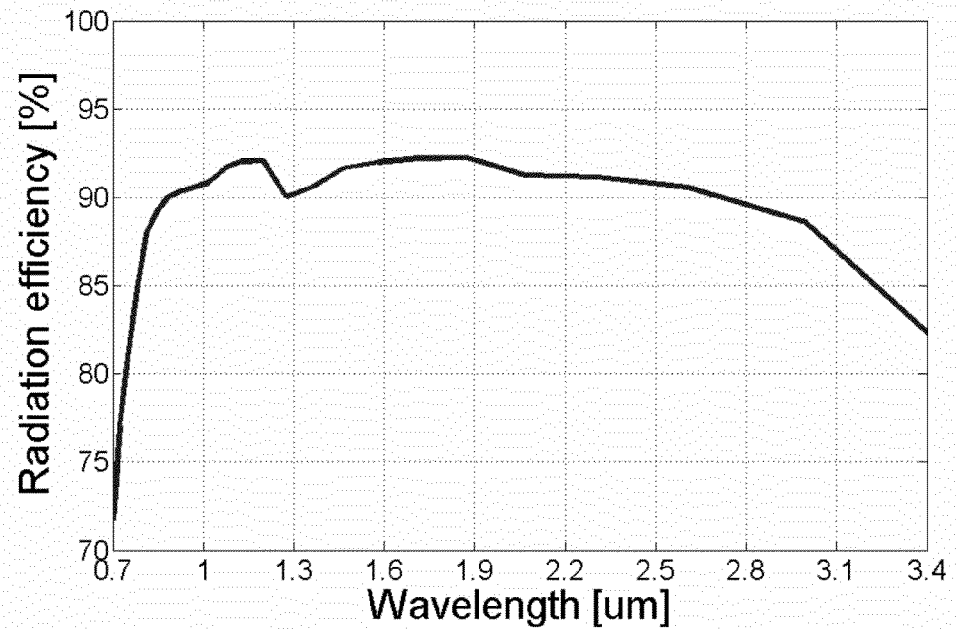
FIGS. 8A and 8B show the radiation efficiency (FIG. 8A) and peak and broadside realized gain (FIG. 8B) obtained by computer simulations performed according to some embodiments of the present invention.
Figure 8B:
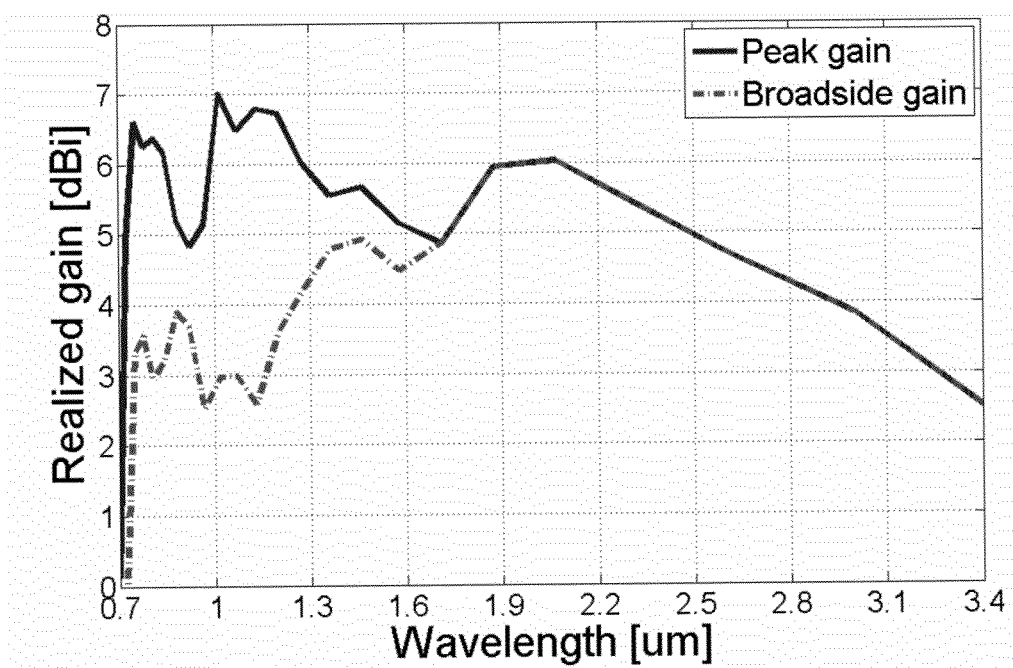

FIGS. 8A and 8B show the radiation efficiency (FIG. 8A) and peak and broadside realized gain (FIG. 8B). The radiation efficiency is defined as the radiated to accepted (input) power ratio. As shown in FIG. 8A, the radiation efficiency of the system of the present embodiments remains higher than 85% for all wavelengths ranging from 0.78 μm to 3.23 μm (122% efficiency bandwidth).

Due to the Quartz substrate that operates as a lens, the far field pattern is not symmetric and the higher directivity is in the Quartz direction. At the lower wavelengths the Quartz substrate changes the antenna pattern and the peak gain is shifted from the antenna broadside. The maximum realized gain (including the mismatch loss) at the antenna broadside direction reaches 6 dBi, and the peak gain is about 7 dBi (see FIG. 8B). These values are significantly higher compared to conventional nano-antennas, especially if one takes into account that the system is a single layer structure, without a ground plane. According to the reciprocity theorem for an antenna comprising isotropic materials, the radiation pattern of such an antenna is equal to its receiving pattern.

Example 2

Fabrication of an Array of Nano-antenna Systems

Figure 9A:
FIGS. 9A and 9B are electron microscope images of antenna arrays fabricated according to some embodiments of the present invention.
Figure 9B:
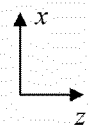

Arrays of nano-Antenna systems were fabricated using E-beam lithography. Two types of arrays were fabricated. In a first type, several sets of nano-antenna systems as described in Example 1 were fabricated, where the antenna systems at each set were connected in series along the x direction. In a second type, the antenna systems were arranged as in the first type, except that each individual antenna systems was devoid of air gaps between the Vivaldi elements. FIGS. 9A and 9B are electron microscope images of the fabricated first and second arrays.

Figure 10A:
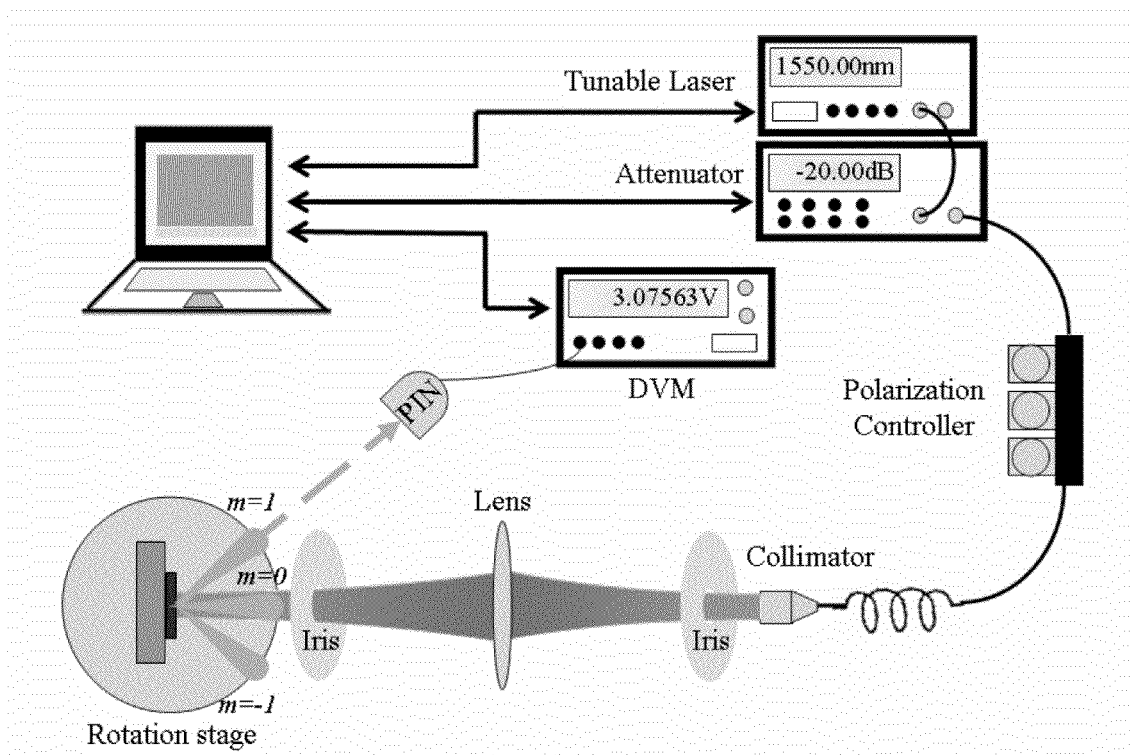
FIG. 10A is a schematic illustration of experimental setup used according to some embodiments of the present invention for characterizing the antenna arrays of FIGS. 9A and 9B.

The fabricated antenna arrays were subjected to measurements using an experimental setup designed to characterize the antenna arrays. The experimental setup is schematically illustrated in FIG. 10A.

The arrays were illuminated by a collimated beam, emitted by a tunable IR laser source in the 1450-1640 nm range. The light was linearly polarized in a direction that was parallel to the Vivaldi columns. The sample was placed on a fine rotation stage (θ-φ) which was mounted on a high resolution XYZ translation stage to allow control over the alignment and orientation of the sample relative to the incident light. Each array was positioned at the waist of the incident Gaussian beam, so as to equally excite all nano-antennas in the array in both amplitude and phase.

Light emitted from the nano-antennas was detected by a high sensitivity InGaAs photodiode (NewFocus 2153), which was positioned 55 cm from the sample at an angle of 60° relative to the incident beam. The lateral pitch of the arrays was 1.79 μm, thus yielding the first-order Bragg diffraction lobe at 60° with respect to the incident beam at λ=1550.2 nm for a normally incident excitation beam. This configuration is advantageous from the standpoint of strong suppression of the direct reflection of the excitation beam from the substrate surface, which allows for convenient measurement of the radiation emitted from the nano-antennas.

Figure 10B:
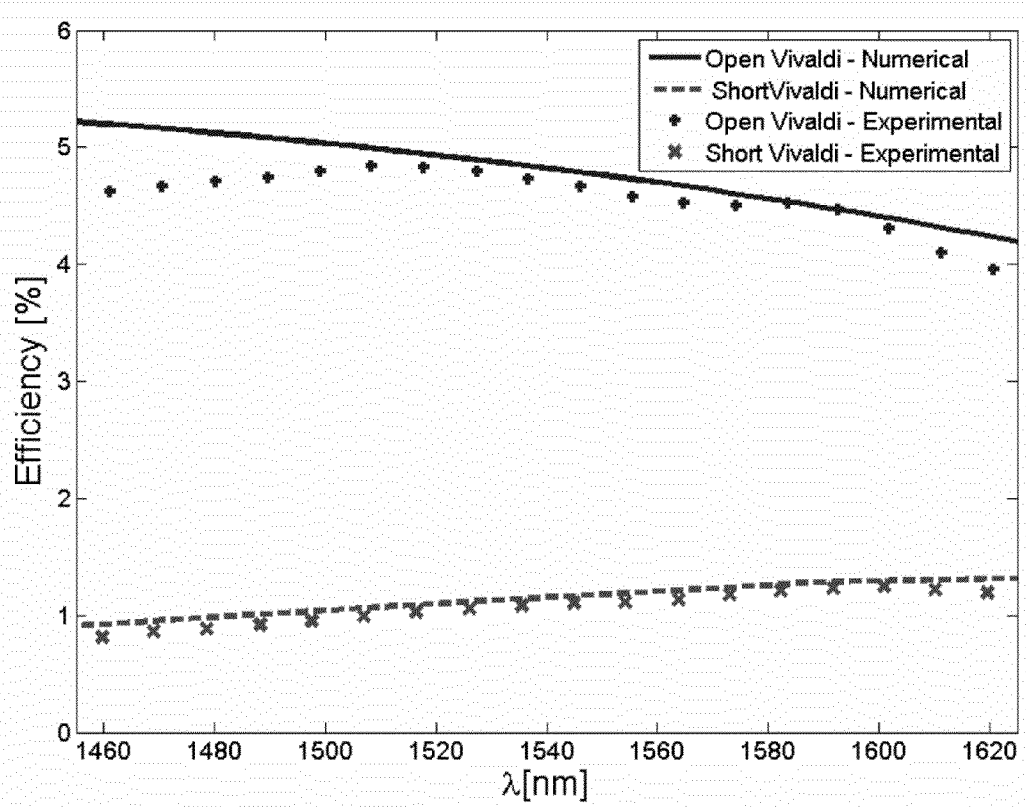
FIG. 10B shows radiation efficiency of fabricated antenna arrays as measured in experiments performed according to some embodiments of the present invention.

The radiation efficiency of the fabricated arrays was measured and compared to the theoretical predictions. The results for one lobe out of the 6 lobes (lobe +1) are shown in FIG. 10B. As shown, there is an excellent agreement between the simulations described above and the experimental measurements. Summing all the lobes resulted in efficiency higher than 90%.

Example 3

Additional Shapes of End-fire Antenna Elements

Additional exemplary configurations suitable for the antenna system according to some embodiments of the present invention are illustrated in FIGS. 11-14B.

Figure 11:
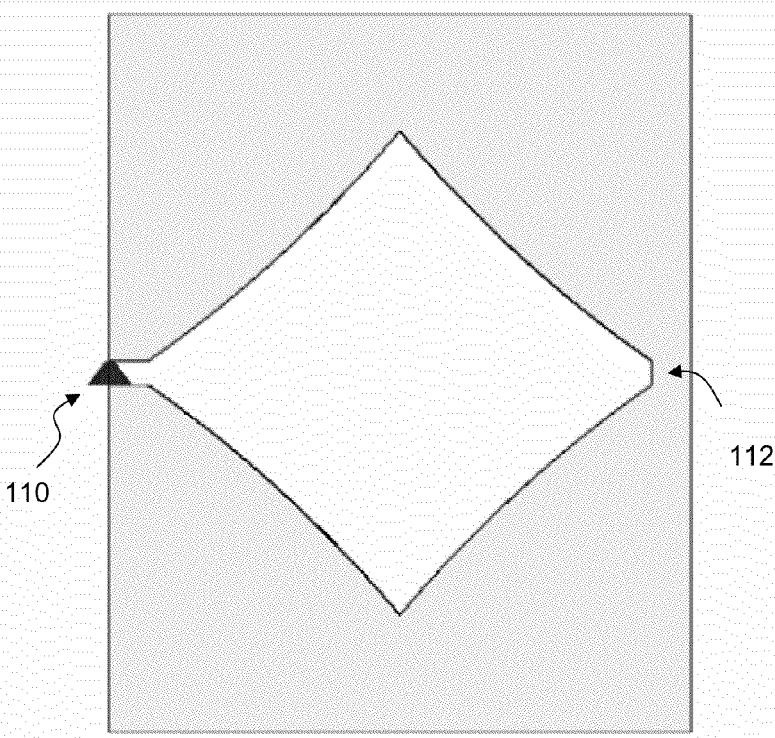
FIG. 11 illustrates an antenna system in embodiment of the invention in which the system is fed from one side only, at the gap between the end-fire antenna elements, wherein at the opposite side, the elements are connected to each other.

FIG. 11 illustrates an embodiment in which the system is fed from one side only, at the gap between the end-fire antenna elements, wherein at the opposite side, the elements are connected to each other. The feed is shown at 110 and the opposite side is shown at 112. Also contemplated are embodiments in which the opposite side 112 is open (namely a gap is present but no feed is connected thereto) and embodiments in which the opposite side 112 is connected to another load.

Figure 12:
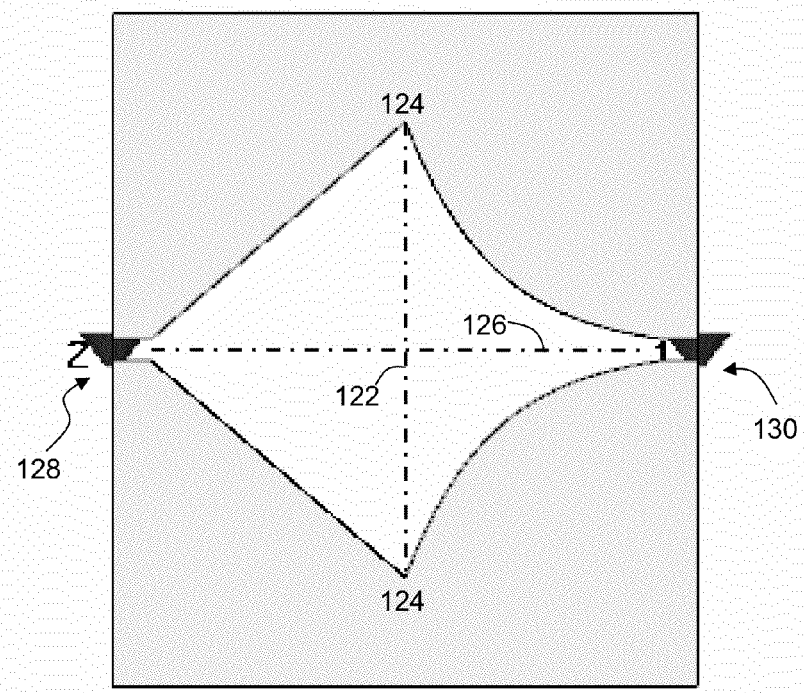
FIG. 12 illustrates an antenna system in embodiment of the invention in which the system comprises geometrically asymmetric end-fire antenna elements.

FIG. 12 illustrates an embodiment in which the system comprises geometrically asymmetric end-fire antenna elements. In these embodiments, each slot is asymmetric with respect to a meridian line 122 connecting the stub 124 and aperture 126, perpendicularly to the aperture 126. The system can be fed from both gaps 128 and 130, as illustrated in FIG. 12, or at one gap only, as described above.

Figure 13:
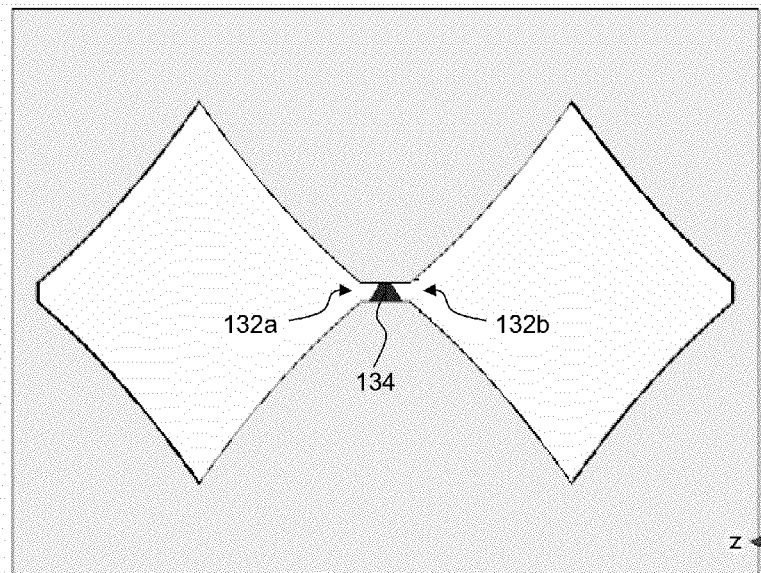
FIG. 13 illustrates an antenna system in embodiment of the invention in which a pair of antenna systems is arranged in parallel with respect to the direction of the end-fire radiation.

FIG. 13 illustrates an embodiment in which a pair of antenna systems is arranged in parallel with respect to the direction of the end-fire radiation. In other words the two systems in the pair are arranged such that their apertures are generally collinear. The two systems are connected at the gaps 132a, 132b between their end-fire antenna elements. The pair can include a single feed 134, for example, at the gaps 132a, 132b or it can include a plurality of feeds, e.g., one feed at each gap. Also contemplated are similar arrangements with more than two antenna systems arranged in parallel.

Figure 14A:
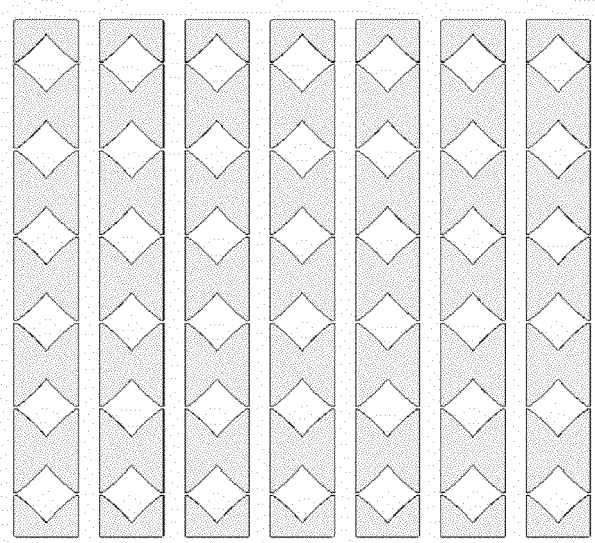
FIGS. 14A and 14B illustrate an antenna system in embodiments of the invention in which a plurality of antenna systems is arranged an array.
Figure 14B:
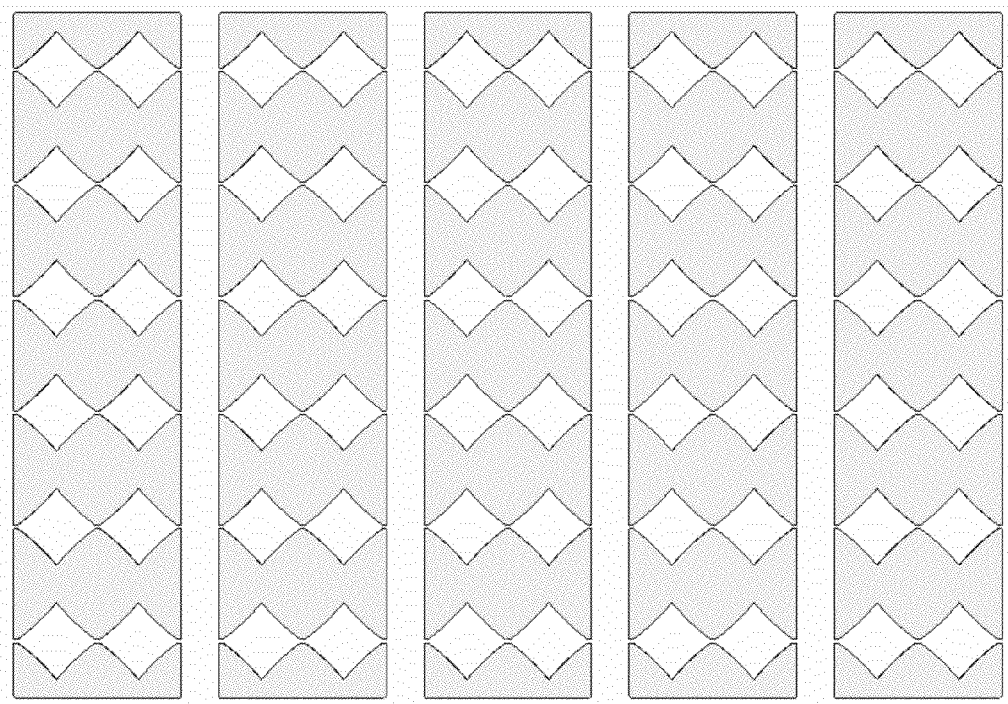

FIGS. 14A and 14B illustrate embodiments in which a plurality of antenna systems is arranged an array. In the representative example of FIG. 14A, the array comprises a set of linear arrays, wherein in each linear array, the antenna systems are arranged in series with respect to the end-fire radiation direction (the x axis). In other words the systems in the linear array are arranged such that their apertures are generally parallel and not collinear. The linear arrays are arranged parallel to each other.

In the representative example of FIG. 14B, the array comprises a set of linear arrays, wherein each linear array comprises several pairs of parallel antenna systems each pair being similar to the pair illustrated in FIG. 13. The pairs in each linear array are arranged in series with respect to the end-fire radiation direction. The linear arrays are arranged parallel to each other.

Note that the configurations in FIGS. 14A and 14B provide DC connection between the antenna systems in the array. This embodiment is particularly advantageous for energy harvesting and other applications. Also contemplated are other arrangements of the antenna systems in an arrays, optionally and preferably, but not necessarily, with a DC connection between individual antenna systems in the array.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An antenna system, comprising a first end-fire antenna element and a second end-fire antenna element facing each other in a planar arrangement, said antenna elements having a thickness which is larger than a skin depth of a material forming said antenna elements, said antenna elements being positioned to form one or more air gaps therebetween, and being configured to cause destructive interference between individual end-fire radiations of said elements, while maintaining constructive interference generally perpendicular to said planar arrangement.

2. The system of claim 1, wherein said first end-fire antenna element is identical to said second end-fire antenna.

3. The system according to claim 1, wherein each of said antenna elements is a slot antenna element having a tapered profile.

4. The system according to claim 3, wherein said tapered profile is characterized by an opening rate selected such that a ratio between an imaginary part and a real part of an impedance of said antenna system is less than 50%.

5. The system according to claim 4, wherein said opening rate is from about 0.0001 to about 0.01 $nm^{-1}$.

6. The system according to claim 3, wherein each slot has a stub and an aperture and is symmetric with respect to a meridian line connecting said stub and aperture, perpendicularly to said aperture.

7. The system according to claim 3, wherein each slot has a stub and an aperture and is asymmetric with respect to a meridian line connecting said stub and aperture, perpendicularly to said aperture.

8. The system according to claim 1, wherein each of said antenna elements is a Vivaldi antenna element.

9. The system according to claim 1, wherein a thickness of said antenna elements is at least 2 times said skin depth.

10. The system according to claim 1, wherein a width of said gap is selected so as to allow emission of radiation in a transverse optical mode while suppressing higher optical modes.

11. The system according to claim 1, wherein a width of said gap is at least 10 nm.

12. The system according to claim 1, further comprising a waveguide coupled to said gap.

13. The system according to claim 12, wherein said waveguide is a parallel plate waveguide.

14. The system according to claim 1, wherein at least one of said first and said second end-fire antenna elements has a nanometric size along at least one dimension of said element.

15. The system according to claim 1, wherein at least one of said first and said second end-fire antenna elements has a nanometric size along a largest dimension of said element.

16. An antenna array, comprising a plurality of antenna systems according to claim 1.

17. The array according to claim 16, wherein at least a portion of said antenna systems are connected in series with respect to a characteristic direction of said end-fire radiations.

18. The array according to claim 16, wherein at least a portion of said antenna systems are connected in parallel with respect to a characteristic direction of said end-fire radiations.

19. The array according to claim 16, wherein said antenna systems are connected via DC connection.

20. A method of detecting electromagnetic radiation, comprising generating condition for the radiation to interact with the antenna system or array according to claim 1, and collecting electrical signals generated by said antenna system.

21. The method according to claim 20, wherein said electromagnetic radiation comprises radiation in the infrared range.

22. The method according to claim 20, wherein said electromagnetic radiation comprises radiation in the visible range.

23. A method of emitting electromagnetic radiation, comprising applying voltage to the antenna system or array according to claim 1, thereby generating the electromagnetic radiation.

24. A method of converting electromagnetic radiation into electricity, comprising generating condition for the radiation to interact with the antenna system or array according to claim 1, and collecting electrical signals generated by said antenna system.

25. A system, comprising the antenna system or array according to claim 1, wherein the system is selected from the group consisting of an optical sensor system, optical communication system, an imaging system, a light projector, a high harmonics generating system, a wave mixing system, a frequency conversion system, and a phased array.

26. The method according to claim 1, wherein said antenna elements comprise metal.

* * * * *